United States Patent [19]

Santee

[11] 4,408,664

[45] Oct. 11, 1983

[54] SECONDARY OIL RECOVERY METHOD

[75] Inventor: Harold P. Santee, Skiatook, Okla.

[73] Assignees: Jack H. Santee; Robert P. Santee; Catherine A. McAfee, all of Tulsa, Okla.

[21] Appl. No.: 184,255

[22] Filed: Sep. 26, 1980

[51] Int. Cl.³ ................. E21B 43/20; E21B 43/27
[52] U.S. Cl. ................. 166/263; 166/271; 166/274
[58] Field of Search ........... 166/273, 274, 275, 263, 166/268, 271, 302, 307

[56] References Cited

U.S. PATENT DOCUMENTS

| | | | |
|---|---|---|---|
| 1,899,497 | 2/1933 | Doherty | 166/268 |
| 2,669,307 | 2/1954 | Mulholland et al. | 166/273 X |
| 2,765,039 | 10/1956 | Bond et al. | 166/307 |
| 2,823,751 | 2/1958 | Offeringa | 166/263 |
| 2,875,833 | 3/1959 | Martin | 166/268 |
| 3,076,762 | 2/1963 | Dill | 166/307 |
| 3,135,326 | 6/1964 | Santee | 166/273 X |
| 3,279,538 | 10/1966 | Doscher | 166/263 |
| 3,948,324 | 4/1976 | Lybarger | 166/307 |
| 4,044,833 | 8/1977 | Volz | 166/307 |

Primary Examiner—Stephen J. Novosad
Assistant Examiner—George A. Suchfield
Attorney, Agent, or Firm—Head, Johnson & Stevenson

[57] ABSTRACT

A method of oil recovery from subterranean formations, and especially water wet sand formation, comprising the steps of sequentially establishing a rate of oil production for the formation as a function of formation characteristics, such as perosity, permeability, depth of formation and past production from the formation. Second, injecting into the formation a bank of chilled water solution containing carbon dioxide gas and citric acid and phosphoric acid. Third, driving the bank of water solution from the injection well by any suitable means to the production well and withdrawing oil from the production well at the established rate of oil production. The method is especially adapted as a tertiary oil recovery method and effectively provides a 70% horizontal and vertical sweep of the formation.

6 Claims, 3 Drawing Figures

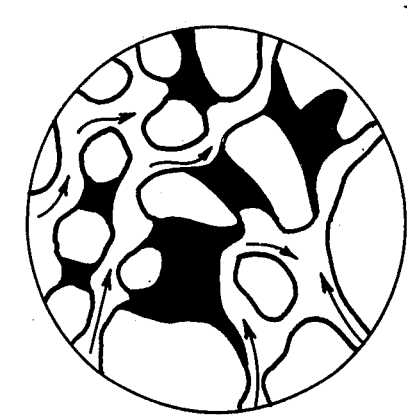
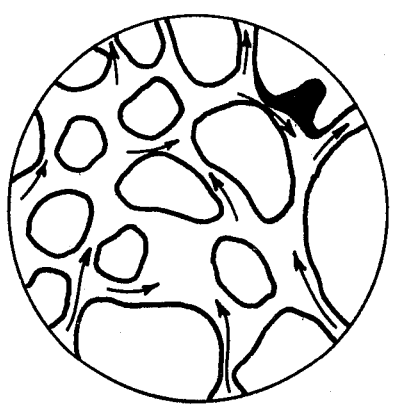
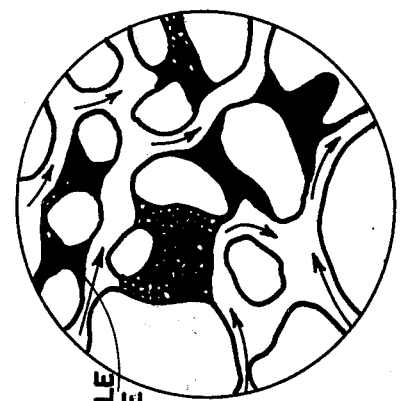
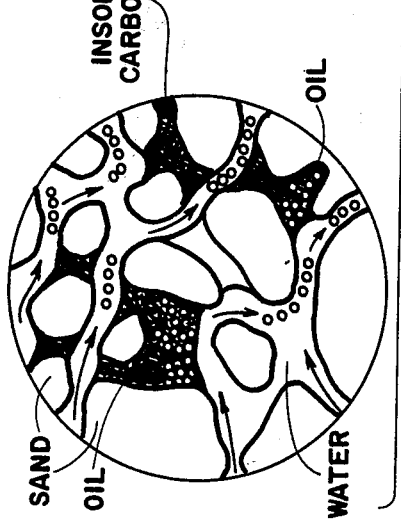
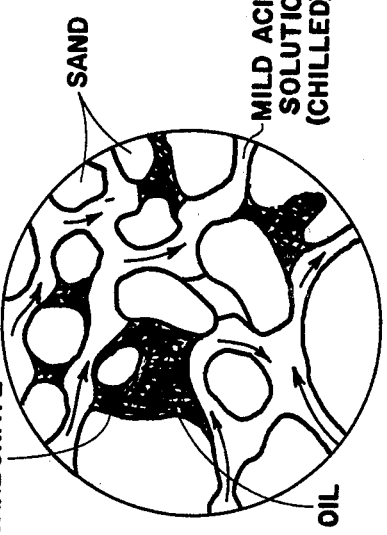
Fig. 2
Fig. 3

SECONDARY OIL RECOVERY METHOD

BACKGROUND OF THE INVENTION

1. Field of the Invention

The present invention relates to a method of tertiary or enhanced oil recovery from certain subterranean oil reservoirs and, more particularly, to a method for recovering oil from sandstone reservoirs through the injection of a specially prepared fluid as the drive mechanism wherein the binder of sand grains are dissolved into a true solution thereby releasing the oil trapped in the capillarities and discontinuous solution channels provided a bi-lateral flow of the oil and drive process fluid from the formation to a production system for producing wells.

2. Description of the Prior Art

It is now recognized by the oil fraternity that three main physical and chemical factors that must be taken in account in order to recover residual oil are capillary retention forces, mobility relationships and reservoir heterogeneity. Capillary retention forces operate when oil and water are present within a porous rock system. The rock wetting phase, usually water, traps the fluid contents obtained in single pores, capitillarities, and discontinuous solution channels of the vortex of sand grains. Mobility relationships are determined by the surface tension between the oil and the water. The heterogeneity of a reservoir is unlike any other reservoir in its physical and chemical composition and even within a single reservoir the heterogeneous composition has a marked variance from one point to another.

Scientists have come to the conclusion that the earth was formed from a "big bang" episode and that the earth formed from a collection of this cosmic dust and debris. As a quantity of unconsolidated crust of the earth became engulfed in a vast fire and the products of which provided the tools which consolidated and shaped various sedementary beds that comprised the present crust.

This hypothesis has considerable support from known and established chemical action and reaction by continued analysis of the mineral content of the sedementary beds. These beds contain silicon dioxide, a widely distributed non-metallic compound, and the carbonates of base forming metals and/or alkaline earth metals. Further evidence under the hypothesis indicates that all elements were originally created through mutation from a common substance. Accordingly, the first chemical reaction would be the oxidation. Continuing, the next step would be continued reaction with the carbon dioxide to form carbonates. For example, it is well known that calcium oxide and carbon dioxide form the insoluble carbonate of calcium. Further reaction with an excess of carbon dioxide form soluble calcium bicarbonate. This form remains until its deposition is effected by the evaporation of the liquid vehicle. Such evaporation is typical of that which occurred on beaches and sandbars of the ancient seas. The evaporation decomposes the bicarbonates by release of the $CO_2$ and reverts them to insoluble carbonate form. The analysis of oil well cores, in fact, shows the matrix or cementitious material of the rock to be insoluble carbonates. In some instances this carbonaceous matrix amounts to as much as 50% of the formation bulk.

Of current interest, is the production of oil from underground oil bearing formations by what is called "tertiary or enhanced recovery methods." Such methods are typically instituted after a primary production program and a secondary program using water as a drive mechanism to force the oil to a producing well. These two oil recovery methods are generally conceded to leave large amounts of residual oil in place. This unrecovered oil is caused by many factors including retention forces of the capillarities and discontinuous solution channels, the surface tension in the oil and water together with the viscousness of the oil itself and the heterogeneity of the reservoir. Other factors detrimental to the efficient recovery of the residual oil are improper oil well completions, incompatibility of the driving fluid to the characteristics of the oil bearing formation, use of excessive pressures that cause channeling and other minor techniques not conducive to the efficient recovery operation.

Accordingly, tertiary or enhanced recovery techniques have been developed that show promise of recovering a large amount of the residual oil which would be lost after a secondary oil recovery operation had reached economic limits. Typically, tertiary or enhanced recovery techniques require certain additives to the propelling force that will release the oil trapped in the capillarities and at the same time reduce the surface tension and also the heterogenous nature of the producing formation. In some instances single well injection production methods are proposed and prior to the start of a tertiary or enhanced oil recovery operation certain production wells will be injected with the processed fluid and is to be included within the scope of this invention.

Water drive or water flooding is the most widely used secondary recovery technique. Here, residual oil is recovered by injecting water into one or a series of wells where it is forced vertically and horizontally toward one or more producing wells thereby driving the oil ahead of the water. Although a water drive process has certain economic advantages, channeling or gravity segregation of the oil and water caused by the water drive process interferes with efficient displacement of oil from large segments of the formation.

An advanced tertiary oil recovery method was described in my U.S. Pat. No. 3,135,326 entitled "Secondary Oil Recovery Method". My prior method utilized the injection of various banks of fluids to aid in oil recovery. In certain water wet sand formations a different method may be used and is the basis of this application.

SUMMARY

It is a primary object of the invention to provide a method of tertiary and/or enhanced oil recovery which overcomes the problems associated with prior recovery methods and in which a greater portion of residual oil is recovered.

An additional object of this invention is to provide a method of oil recovery wherein the oil and its containing elements are treated in a manner that eliminates the tension forces of the capillarities and discontinuous solution channels thereby reducing the surface tension between the oil and water providing a bi-lateral flow of the oil and water or processed fluid.

An additional object of this invention is to provide a process for the recovery of oil from subterranean formations wherein the formation and the oil therein are chemically and physically treated to obtain maximum recovery of the in place oil, and to further provide a relatively slow movement of the drive process, i.e.

without excess surface pressure, from an injection well into a producing well whereby a chemical and physical treatment will have sufficient time to react with the oil and formation structure.

It is a further object of this invention to provide an improved method of oil recovery by an improved chemical fluid drive.

A still further object of this invention is to provide a method of recovery of relatively high viscosity oil without by-pass and channeling of the drive fluid.

A yet still further object of this invention is to provide a method of oil recovery from formation of restricted permeability and perosity.

An additional object of this invention is to recover oil from a formation wherein the heterogeneity of the formation prevents simple water drive methods from releasing the oil trapped within the formation.

It is a still further object of this invention to achieve a minimum of 70% horizontal and vertical sweep of the sand section under attack, by controlled withdrawals from the producing wells.

An additional object of this invention is to permit the use of incompatible waters in a chemical solution as a driving fluid thereby eliminating any plugging action of clay and/or other soluble debris.

A still further object of this invention is to eliminate the retention forces of capillaries thereby releasing the oil trapped therein to the bi-lateral flow of the solution channels.

An additional object of this invention is to provide a reduction of the surface tension between the chemical driving fluid and the oil.

These and other objects of this invention will become more apparent upon reading of the specification and claims when taken in conjunction with the provided illustrations.

BRIEF DESCRIPTION OF THE DRAWINGS

FIG. 2 is a diagrammatical illustration of a conventional water drive; and

FIG. 3 is a diagrammatical illustration of the drive process of this invention.

DETAILED DESCRIPTION OF THE PREFERRED EMBODIMENTS

Figure 1:
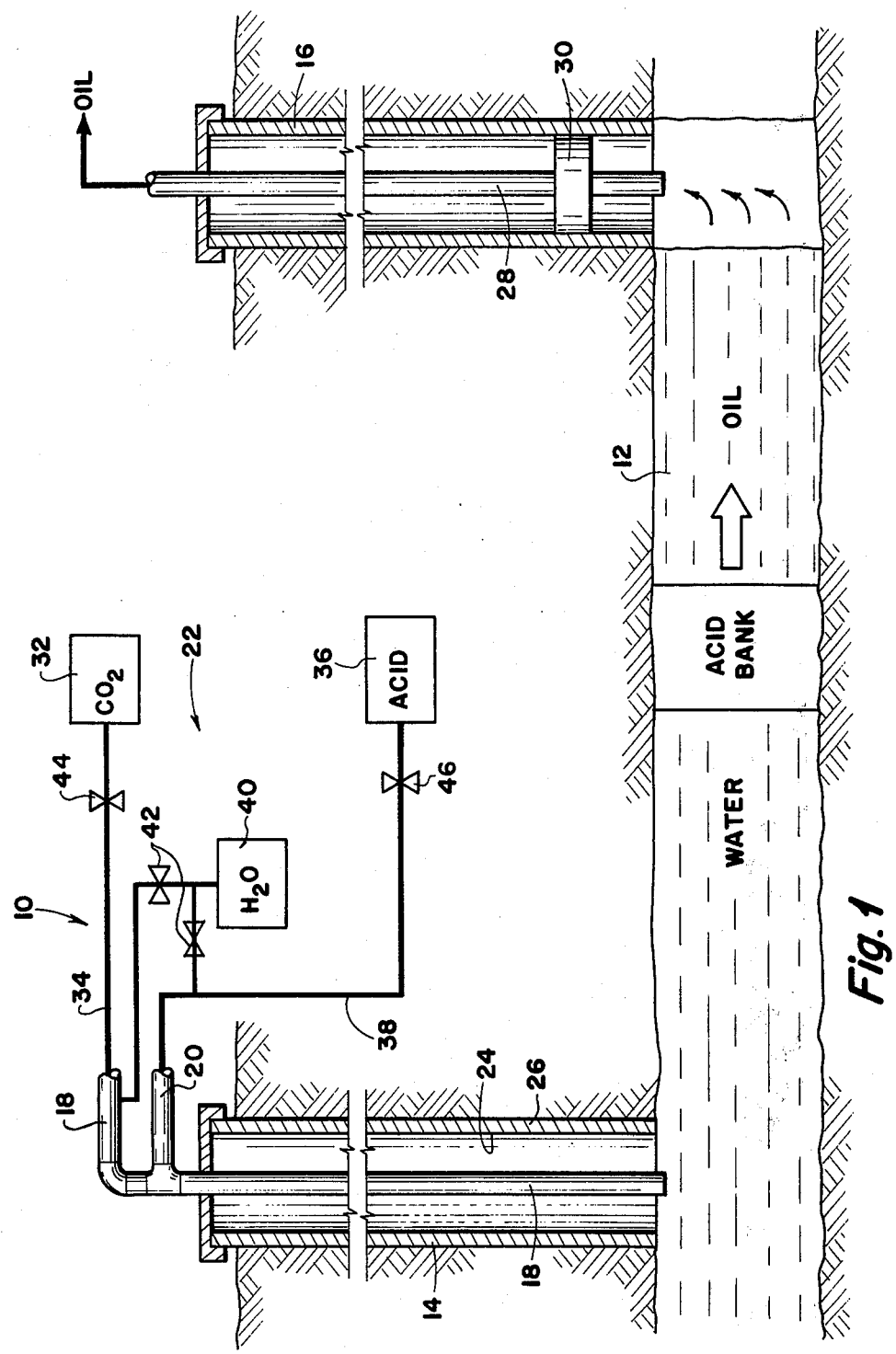
FIG. 1 is a schematic drawing showing a vertical section through an oil bearing formation penetrated by wells and describing the method in accordance with this invention.

This invention concerns a tertiary or an enhanced oil recovery method which is an improvement upon my U.S. Pat. No. 3,135,326 for a "Secondary Oil Recovery Method" which is incorporated herein by reference.

Referring to FIG. 1, reference character 10 generally indicates an injection system for injecting a bank of solution into an oil bearing formation 12 which is penetrated by an injection well 14 and a production well 16, which are cased, cemented or completed in any well known manner. The injection well 14 includes a first injection tubing 18 which extends from the ground surface to a point adjacent the formation 12. Tubing 20 connects thereto. The production well 16 is provided with a tubing 28, with a packer 30 therearound, which extends from the oil formation 12 to the surface and the oil flowing therethrough proceeds to typical oil separating equipment (not shown). In the event that the natural flow pressure from the oil formation 12 is insufficient to provide a flow of oil through the tubing 28 to the surface, a mechanical lifting means, such as are well known in the art, may be attached thereto.

The surface equipment 22 used with the method of this invention is schematically described and positioned with respect to the injection well 14 and tubings 18 and 20. Carbon dioxide in gaseous form is supplied from a container 32 through a supply conduit 34 to the tubing 18. Mild acids such as citric and phosphoric and/or oxalic are supplied from a container 36 through a conduit 38 to the injection tubing 20. A water supply 40 is adapted to be routed through either tubing 18 or 20 according to the position of the valves 42. The supply of $CO_2$ is regulated by a valve 44 through the conduit 34 and the supply of acid is regulated by a valve 46 through the conduit 38.

The first step in practicing the present invention is to establish a rate of production for a well or a field of wells as a function of formation characteristics. A standard analysis of a core section from the formation 12 is taken and the porosity, permeability, conate water content of the formation and the viscosity and gravity of the oil are determined. Additional formation information such as amount of remaining oil, depth of the formation, specific carbonate structure of the formation, and all of the drilling and production logs of the wells are analyzed. From all of the collected data a long term rate of production for the well the field is determined. The rate of production established of course varies from field to field, however, duration of practicing this invention lasts until the production level drops.

Next, the surface equipment 22 is connected to either the injection well 14 or the production well 16. Generally, the production well 16 is treated first by disconnecting the tubing 28 from the oil separating equipment and treating the well 16 according to the present invention before the surface equipment 22 is moved to the injection well 14 or wells. A chilled water solution preferably between 30°-40° F. containing weak acids is injected into the well 14 or 16. The water solution has been injected at temperatures of about 60° F. with no observable decrease in effectiveness. Preferably, one of the acids used is that formed by $CO_2$ gas going into a solution of water forming carbonic acid. In addition thereto, a mild acid such as citric, phosphoric or other organic acids such as oxalic or acetic is combined therewith. The presence of the latter mild acids is added for the purpose of causing increased disassociation of the H ion in the carbonate formation material and hence increase the ability of the $CO_2$ to form and maintain carbonic acid ($H_2CO_3$) in the solution. The water used is preferably saline and deoxized and is typical of those found readily available in the field from shale formations.

In use, the pre-mixed solution is pumped from the container 36 through the conduit 38 and valve 46 to the tubing 20. Simultaneously therewith carbon dioxide gas is passed through the valve 44 and conduit 34 to the injection tubing 18 where it is bubbled into the solution prior to its entry into the formation. The carbon dioxide gas is continuously fed into the chilled solution preferably in quantities between 12 to 20 cubic feet per cubic foot of solution at standard temperature and pressure conditions and at pressures not to exceed 150 p.s.i.g.. Increased pressure up to 300 p.s.i.g. have been used on extremely "dirty" wells in order to force the solution through the debris. It has been found that in that instance where a relatively stable carbonate binder such as barium or magnesium is present within a formation that a relatively smaller quantity or carbon dioxide gas in the solution is necessary. On the other hand, a relatively unstable carbonate binder such as calcium carbonate, requires a greater quantity in solution in order to revert the binder to its bicarbonate form and maintain it in that form.

This citric acid is maintained at a concentration of at least 3½ pounds per 100 barrels of solution and the phosphoric acid has a concentration of at least 1 pound of 75% acid per 100 barrels of solution. The carbon dioxide gas entering into solution forms a weak carbonic acid ($H_2CO_3$). The carbonic acid reacts with the formation carbonate to precipitate the bicarbonic or soluble form. Accordingly, the calcium and/or alkaline earth carbonates of most subterranean formations are reduced to a soluble form and as such are propelled along with the drive fluid. Use of a chilled solution of carbonic acid and deoxidizing acid permits the use of reduced pressures to maintain the acid solution and hence continuous dissolving action of the bicarbonate throughout the drive process. The carbonic acid and deoxidizing bank will be relatively large in extent and it will be injected at the pressure the formation will naturally take fluids. This prevents differentials tending to cause by-passing channeling, and equalizes viscosity differentials between the driving and driven fluids. The acid solution is benign to the clays in the formation and will not cause swelling or clogging thereof. A sufficient bank of carbonic acid and citric acid as well as phosphoric acid is one that will permit complete bicarbonic precipitation from injection well to producing well.

After an injection of sufficient quantities of the solution a normal water flooding or water drive system is provided to carry the chemical bank radially and horizontally through the formation 12, forcing oil into the production well 16. Relatively high pressures are not used to drive the bank from the injection well 14 to the production well 16 in that only hydrostatic pressure existing within the injection well 14 is permitted to effect immediate replacement of fluids as they move in the formation. Hence, the chemical reaction time of converting the normally insoluble carbonates to the soluble form is permitted to take place in situ without dilution or by-passing.

The increased efficiency of the drive process of this invention is diagrammatically shown in FIGS. 2 and 3. An ordinary water drive process as shown in FIG. 2 fails to eliminate pockets and barriers, such as the insoluble carbonate binder, which entraps oil whereas FIG. 3 illustrates the chemical attack of the barriers to release the oil to permit flow of the drive fluids. The view showing the various stages, from left to right, of typical core analysis results. For example, in FIG. 2, it should be noted that the insoluble carbonate binder (indicated in solid black) is not dissolved or eliminated in an ordinary water drive process and instead supports capillary traps for oil. Likewise, FIG. 3 is a step-by-step analysis of typical cores using the process of this invention after passage of the water solution containing the above mentioned acids. The chemical bank of chilled carbonic acid and citric acid and phosphoric acid is not only adapted to eliminate the insoluble carbonate barriers but also is a driving fluid for removing the oil pockets from therein.

This slow process provides an effective 70% sweep both horizontally and vertically in the formation thereby recovering more oil than previously obtainable.

The last step in practicing the method of the present invention is the controlled withdrawal of oil from the formation 12. The production well 16 is closely monitored to ensure that an average daily production rate according to the established production rate is maintained. The production well 16 is maintained on this method for a long term period until the production drops indicating the need of a second treatment or that all of the recoverable oil has been removed.

It should be understood that the above description illustrates a single injection and production well system. The method is most commonly used on a number of wells such as a lease under a water flood.

In order to best illustrate the effectiveness of the method of the present invention a few examples are provided below.

The first actual test involved an eighty acre lease in northeastern Oklahoma having a number of production wells and injection wells. The equipment was connected to an injection well and after start up would take 3 barrels of solution per day at 560 pounds pressure. The high pressure is needed due to the tremendous amounts of debris contained therein. At the end of three days the well was taking 40 barrels of solution a day at a much reduced pressure. The equipment was disconnected and moved to a second injection well and after a set up took 15 barrels of solution at 560 pounds of pressure. After four days of treatment the well stabilized at 60 barrels a day at a much reduced pressure. Next, the equipment was moved to a producing well which had never produced more than ¾ barrel per day of oil. this particular well had in the past received treatment by nitro, acid application and fracking all without an increase in daily oil production. After the equipment was attached to the well and the injection process started the well took the solution at the rate of 5 barrels per day. Twenty-four hours later the well was taking solution at 20 barrels per day at a varying pressure of between 270-290 pounds p.s.i.g. At the end of a 75 hours period the well went on vacuum taking fluid at a rate of 325 barrels per day. The water flood equipment was reconnected to the injection wells and after a 15 month period the treated production well produced 1800 barrels of oil which was an average of four barrels per day.

The next test was on a flowing flood having 1334 wells of which 700 were producing wells. Total daily production of the flood averaged 270 barrels per day with a large number of the producing wells being inoperative. The equipment was set up on an eighty acre track that had a daily oil production of 6 barrels of oil per day. The equipment was attached to an injection well located in the southeast corner of the lease and the closest producing well in the northeast corner was shut-in for the duration of the test. At the end of a three day treatment on the wells the northeast production well was opened and placed on production. A production well in the southwest corner of the lease had not produced oil for years, was opened and flowed 75 barrels and the third days' production being 29 barrels. The fourth days' production amounted to 21 barrels production and eventually the total lease stabled at 16 barrels of oil per day.

Whereas the present invention has been described in particular relation to the drawings attached hereto, it should be understood that other and further modifications of the invention apart from those shown or suggested herein, may be made within the scope and spirit of this invention.

What is claimed is:

1. Method of oil recovery from subterranean formations penetrated by at least one injection well and a production well comprising the steps of:

establishing a rate of oil production for the formation as a function of formation characteristics;

injecting into said injection well a bank of water solution containing carbon dioxide gas and a dissolved citric and phosphoric acid solution; and driving said bank from said injection well to said production well and withdrawing oil from said production well at said established rate of oil production.

2. A method of oil recovery as in claim 1 including the step of injecting a bank of said water solution into said production well prior to establishing said rate of oil production.

3. A method of oil recovery as in claim 1 wherein said bank of water solution being chilled to between 30°–40° F.

4. A method of oil recovery as in claim 1 wherein said carbon dioxide gas being in an amount within the range of 12 to 20 cubic feet per cubic foot of said solution at standard conditions.

5. A method of oil recovery as per claim 1 wherein each 100 barrels of said water solution contains about 1 pound of 75% phosphoric acid and about 3.5 pounds of citric acid.

6. The method of oil recovery as in claim 1 wherein said bank is driven by the injection of liquid water.

* * * * *